(12) United States Patent
Richtsfeld et al.

(10) Patent No.: US 9,339,937 B2
(45) Date of Patent: May 17, 2016

(54) COLLISION PROTECTION DEVICE

(75) Inventors: Michael Richtsfeld, Hörsching (AT); Stefan Ehrenbrandner, Kirchdorf (AT); Gernot Trauner, Buchkirchen (AT)

(73) Assignee: Fronius International GmbH, Pettenbach (AT)

( * ) Notice: Subject to any disclaimer, the term of this patent is extended or adjusted under 35 U.S.C. 154(b) by 773 days.

(21) Appl. No.: 13/395,179

(22) PCT Filed: Sep. 9, 2010

(86) PCT No.: PCT/AT2010/000324
§ 371 (c)(1),
(2), (4) Date: Mar. 9, 2012

(87) PCT Pub. No.: WO2011/029114
PCT Pub. Date: Mar. 17, 2011

(65) Prior Publication Data
US 2012/0168413 A1    Jul. 5, 2012

(30) Foreign Application Priority Data
Sep. 10, 2009  (AT) .................................. 1426/2009

(51) Int. Cl.
*B23K 9/00* (2006.01)
*B25J 19/06* (2006.01)
*B25J 19/00* (2006.01)

(52) U.S. Cl.
CPC ............ *B25J 19/063* (2013.01); *B25J 19/0029* (2013.01)

(58) Field of Classification Search
CPC .......... B23K 9/295; B23K 9/32; B23K 9/323; B25J 19/0029; B25J 19/063; F16L 37/004

USPC ............. 219/137.31, 137.44, 137.51; 285/9.1
See application file for complete search history.

(56) References Cited

U.S. PATENT DOCUMENTS 5,040,915 A * 8/1991 Stuart et al. ................ 403/322.3
5,116,190 A * 5/1992 Silke ............................ 414/735

(Continued)

FOREIGN PATENT DOCUMENTS

AT   411 882    7/2004
AT   009 744    3/2008

(Continued)

OTHER PUBLICATIONS

Japanese Office Action in Japanese Patent Application No. JP 2012-528189, Jul. 9, 2013.

(Continued)

*Primary Examiner* — Dana Ross
*Assistant Examiner* — Brandon Harvey
(74) *Attorney, Agent, or Firm* — Collard & Roe, P.C.

(57) ABSTRACT

A collision protection device for connecting a welding torch connected to a hose pack to a robot arm of a welding robot, comprising two coupling elements that is adapted to be detachably connected to each other by means of magnets, wherein one coupling element is designed to be connected to the welding torch or to a torch coupling that is adapted to be connected to the welding torch, and the other coupling element is designed to be connected to the robot arm, and the coupling elements have openings. The openings in the coupling elements are designed for feeding the hose pack through, and the coupling element that is adapted to be connected to the welding torch or to the torch coupling, or the torch coupling comprises elements to be connected to the hose pack.

11 Claims, 7 Drawing Sheets

(56) References Cited

U.S. PATENT DOCUMENTS

Figure 1:
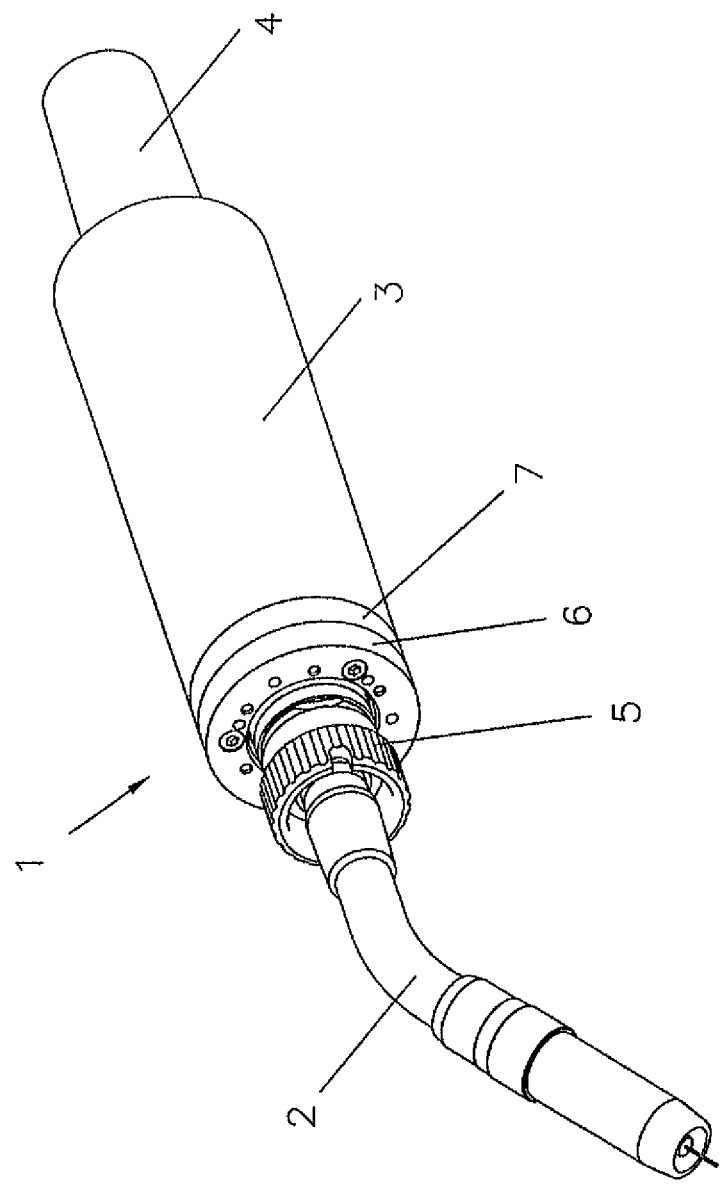

| | | |
|---|---|---|
| 5,954,446 A | 9/1999 | Ireland |
| 6,822,187 B1 | 11/2004 | Hermann et al. |
| 7,157,662 B2 | 1/2007 | Link et al. |
| 7,462,803 B2 | 12/2008 | Hubinger et al. |
| 2007/0284353 A1* | 12/2007 | Laymon .................. 219/137.31 |
| 2011/0006522 A1 | 1/2011 | Bichler et al. |

FOREIGN PATENT DOCUMENTS

| | | | |
|---|---|---|---|
| AT | 505 658 | 3/2009 | |
| DE | 202006014324 U1 * | 11/2006 | ............. B25J 19/063 |
| EP | 1 543 915 | 6/2005 | |
| EP | 1 932 630 | 6/2008 | |
| EP | 1 970 171 | 9/2008 | |
| EP | 2 050 545 | 4/2009 | |
| GB | 2 118 524 A | 11/1983 | |
| JP | 58-171279 A | 10/1983 | |
| JP | 5-220691 A | 8/1993 | |
| WO | WO 2009/080373 | 7/2009 | |

OTHER PUBLICATIONS

International Search Report of PCT/AT2010/000324, Dec. 29, 2010.
Austrian Office Action dated Jun. 17, 2010 with English translation of the relevant parts.
English translation of the International Preliminary Report on Patentability.

* cited by examiner

COLLISION PROTECTION DEVICE

CROSS REFERENCE TO RELATED APPLICATIONS

This application is the National Stage of PCT/AT2010/000324 filed on Sep. 9, 2010, which claims priority under 35 U.S.C. §119 of Austrian Application No. A 1426/2009 filed on Sep. 10, 2009, the disclosure of which is incorporated by references. The international application under PCT article 21(2) was not published in English.

The invention relates to a collision protection device for connecting a welding torch connected to a hose pack to a robot arm of a welding robot, comprising two coupling elements that is adapted to be detachably connected to each other by means of magnets, wherein one coupling element is designed to be connected to the welding torch or to a torch coupling that is adapted to be connected to the welding torch, and the other coupling element is designed to be connected to the robot arm, and the coupling elements have openings.

Such collision protection devices or deactivation boxes, respectively, serve to detect a collision of a welding torch with an obstacle during a welding process and to deactivate the robot unit so as to prevent damage to the welding torch and the robot unit, but also to other components. If the welding torch encounters an obstacle during the welding process along a predetermined path, the welding torch is deflected vis-à-vis the robot arm, so that electrical contacts in the collision protection device are activated. The activation of the electrical contacts in turn results in a preferably immediate deactivation of the welding device or of the robot unit, respectively, so that further damage and further risks may be avoided.

A collision protection device of prior art, comprising a magnetic coupling of the two coupling elements of the collision protection device is, for instance, known from U.S. Pat. No. 5,954,446 A. A disadvantage of this construction is that the hose pack of the welding torch is guided externally of the robot arm which, on the one hand, increases the risk of a collision during the welding process due to the additionally projecting parts and, on the other hand, impairs the response behaviour of the collision protection device. Neither are there indicated any solutions about how the torch is held after a collision. In the case of a collision the torch would thus fall down, so that the torch and possibly the work piece might be damaged or destroyed.

Another construction of a collision protection device is known from AT 411 882 B in which the two coupling elements of the deactivation box are hingedly connected to each other by means of springs. This construction is relatively complex, although the response behaviour is improved by means of the hose pack of the welding torch running in the interior of the collision protection device.

EP 1 543 915 A1 describes a collision protection device of a laser processing head, the coupling elements of which are adapted to be connected by magnets and comprise openings for passing through the laser beam.

The object of the present invention consists in providing an above-mentioned collision protection device characterized both by a compact structure and by an optimum response behaviour. The construction of the collision protection device is to avoid projecting parts or lines between the welding torch and the robot arm to a large extent so as to improve also the accessibility of the work pieces to be welded. Disadvantages of known constructions are intended to be avoided or reduced.

The object according to the invention is solved by an above-mentioned collision protection device, wherein the openings in the coupling elements are designed for feeding through the hose pack, and wherein the coupling element that is adapted to be connected to the welding torch or to the torch coupling, or the torch coupling comprises elements to be connected to the hose assembly. Through the openings in the two coupling elements that are detachably connected to each other, the hose pack is fed through the collision protection device which, on the one hand, renders it possible to improve the response behaviour of the collision protection device and, on the other hand, avoids parts and lines extending outside the collision protection device. Likewise, the hose pack is adapted to be connected to the torch in a simple manner before a welding process is carried out, so that this has not to be effected directly at the robot. In this process, at least a part of the hose pack is threaded after the mounting on the torch through the part of the collision protection device attached to the robot and through the robot itself, so that the part of the collision protection device that is attached to the robot substantially never has to be detached. Furthermore, at least the displaceable length of the hose pack defines the distance by which the coupling elements are allowed to move apart from each other. The coupling elements provide a strain relief of the usual plug contact between the hose pack and the welding torch and prevent that the hose pack is disconnected from the welding torch in the case of a collision of the welding torch with an obstacle.

Advantageously, bellows are arranged over the coupling elements of the collision protection device, so that the collision protection device is protected from pollution. These bellows that comprise a certain elasticity protect the collision protection device both in the closed and in the open condition. The bellows may also sustain part of the weight of the welding torch when the collision protection device is open. The bellows are preferably manufactured of a plastic material and are fitted over the coupling elements or glued or screwed therewith, or fastened by means of clamping elements, such as e.g. clips. If appropriate materials are used for the bellows and if they are fastened appropriately, the weight of the torch and of the collision protection device fastened thereto can be sustained completely in the case of a collision with the collision protection device open, so that no tension forces are exerted on the hose pack.

The coupling element of the collision protection device which is adapted to be connected to the welding torch or the torch coupling is preferably formed by at least one support flange and connected to a torch attachment and possibly a protective ring. The at least one support flange is designed to contact an appropriately magnetized part at the opposite coupling element which is adapted to be connected to the robot arm. The torch attachment is preferably designed such that common welding torches may be connected thereto. Instead of a direct connection of the welding torch to the torch attachment, a torch coupling may also be used as an adapter between the welding torch and the torch attachment. The possible protective ring protects the assembly especially from pollution.

The torch attachment is preferably adapted to be connected to the welding torch or the torch coupling without any tools, for instance, by a bayonet lock or the like.

The protective ring of the coupling element adapted to be connected to the welding torch or the torch coupling is preferably formed of a magnetically shielding material, so that the magnetic attraction of magnetizable particles and the pollution of the collision protection device caused thereby may be reduced.

The coupling element of the collision protection device which is adapted to be connected to the robot arm is preferably formed by at least one base plate and connected to a robot flange, wherein the at least one base plate and the robot flange are preferably connected to each other by screws. The robot flange of the coupling element that is adapted to be connected to the robot arm thus forms the joining member between the collision protection device and the robot arm. Depending on the construction of the robot arm, the robot flange may be of varying design. At any rate, the hose pack runs through the robot flange and through the at least one base plate into the hollow robot arm of the welding robot.

The at least one base plate preferably comprises accommodations for the magnets for the detachable connection of the coupling elements. The magnets may be of varying design and are preferably arranged along the circumference of the at least one base plate around the opening for the hose pack. The sensitivity of the collision protection device may be adjusted by the appropriate dimensioning of the magnets. This is to say by the variation of the number of magnets and/or the force of the individual magnets. Likewise, it is possible to plug and/or press the magnets into the accommodations without making use of an adhesive.

In order to ensure, after a collision, the correct orientation of the welding torch relative to the robot arm, the coupling elements are preferably positioned via at least one positioning element. This always guarantees an exact "Tool Center Point (TCP)". The at least one positioning element may be of varying design.

The at least one positioning element may, for instance, be formed by positioning pins at one coupling element and corresponding recesses for receiving the positioning pins at the other coupling element.

In accordance with another feature of the invention it is provided that electrical contacts are arranged in the torch coupling such that, when this torch coupling is fastened to the welding torch, the contacts around the hose pack are positioned in the opening of the support flange and the connecting lines of the contacts are guided in the hose pack. This provides an optimum arrangement of the electrical contacts that cause a deactivation of the robot unit in the case of a collision. The electrical contacts that are arranged in the torch coupling cooperate with the base plate of the coupling element that is adapted to be connected to the robot arm. In contrast to this, electrical contacts are usually arranged in the collision protection device at the side of the robot. The arrangement of the electrical contacts at the side of the torch is of advantage.

The openings of the coupling elements are preferably of varying diameters, so that a circular ring or an annular step, respectively, is formed which is designed to contact electrical contacts integrated in a coupling element. Hence, the correspondingly arranged electrical contacts contact the circular ring in the closed condition of the collision protection device and the electrical contacts are activated by the circular ring face.

Figure 2:
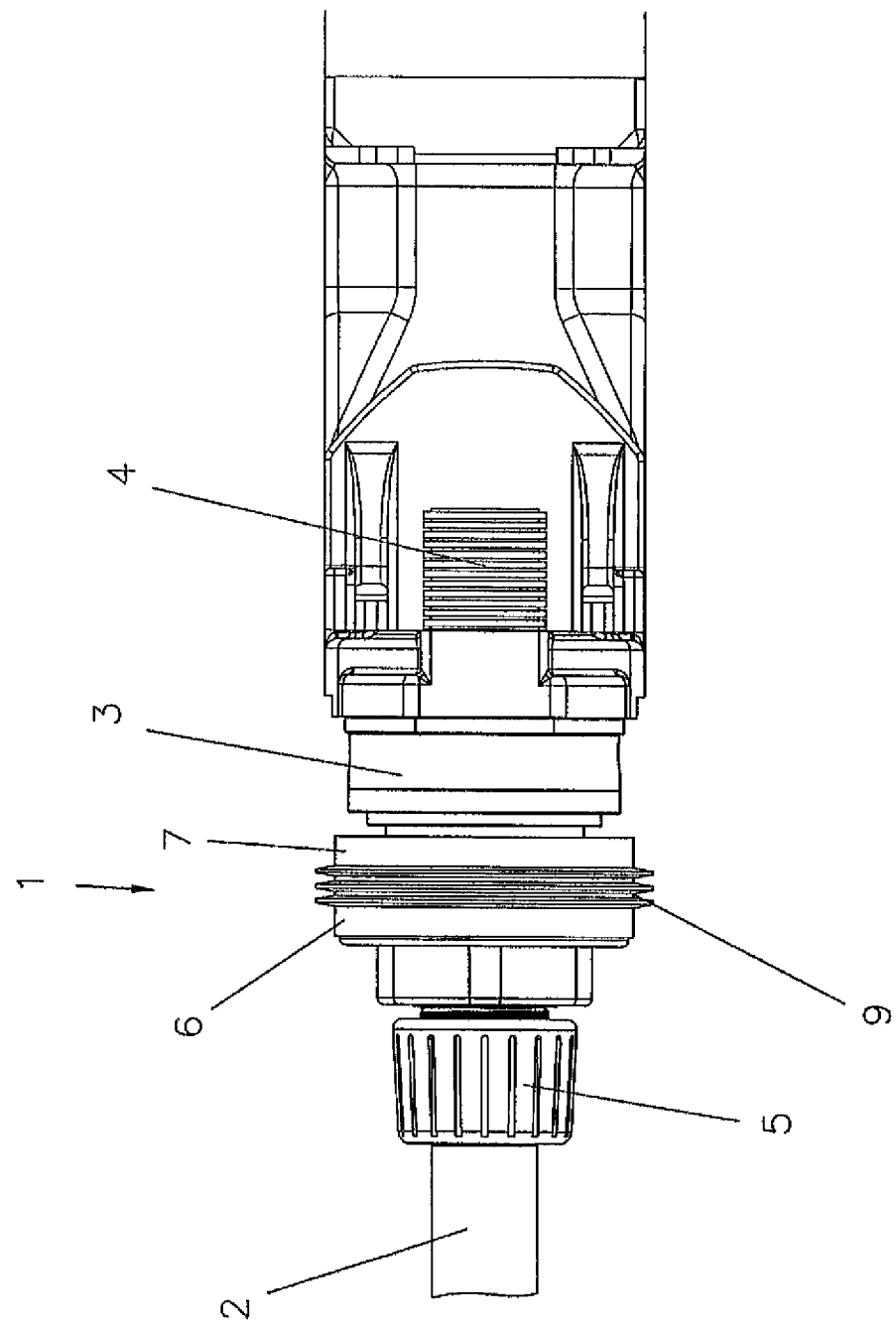
Figure 3:
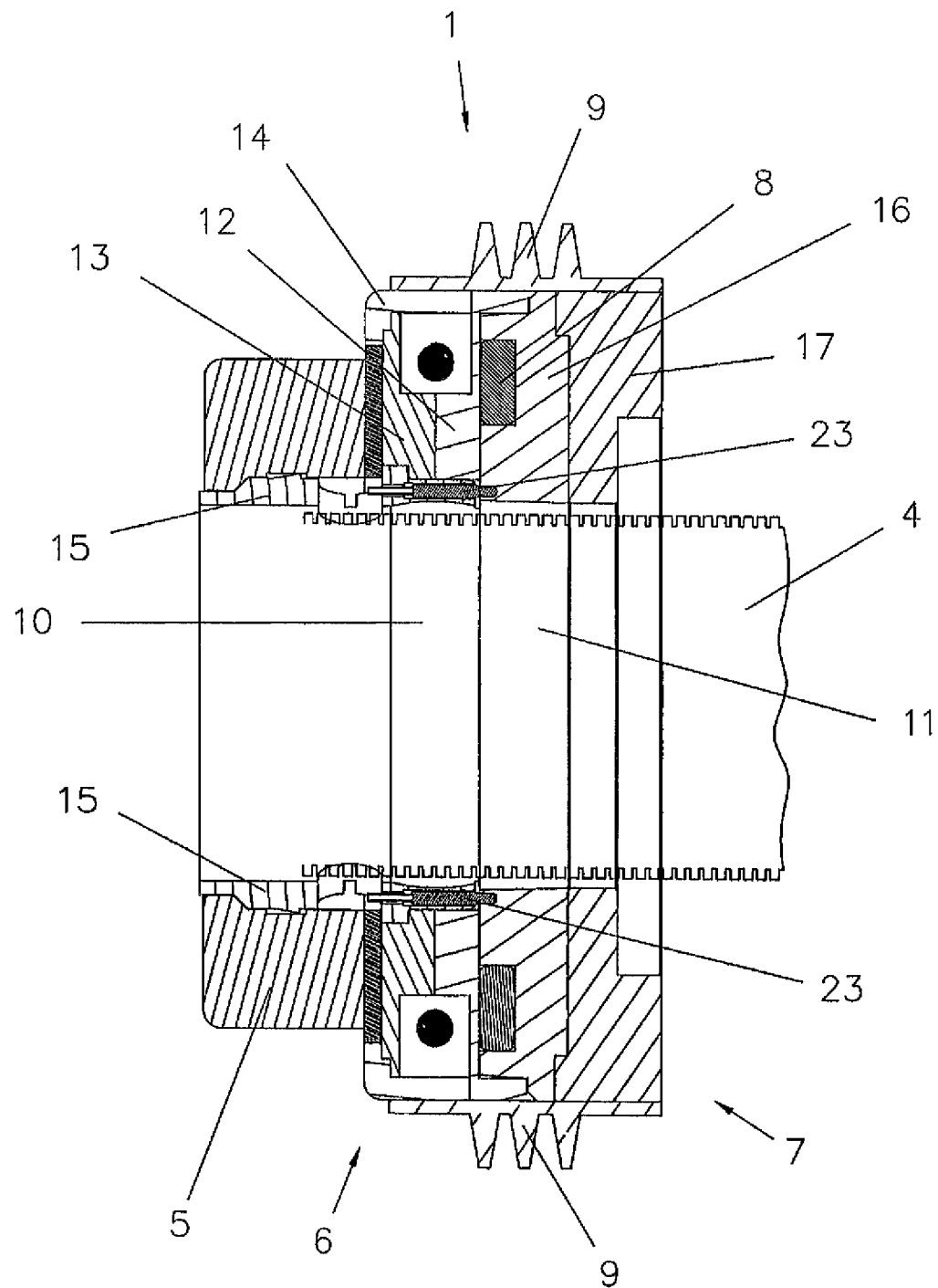
Figure 4:
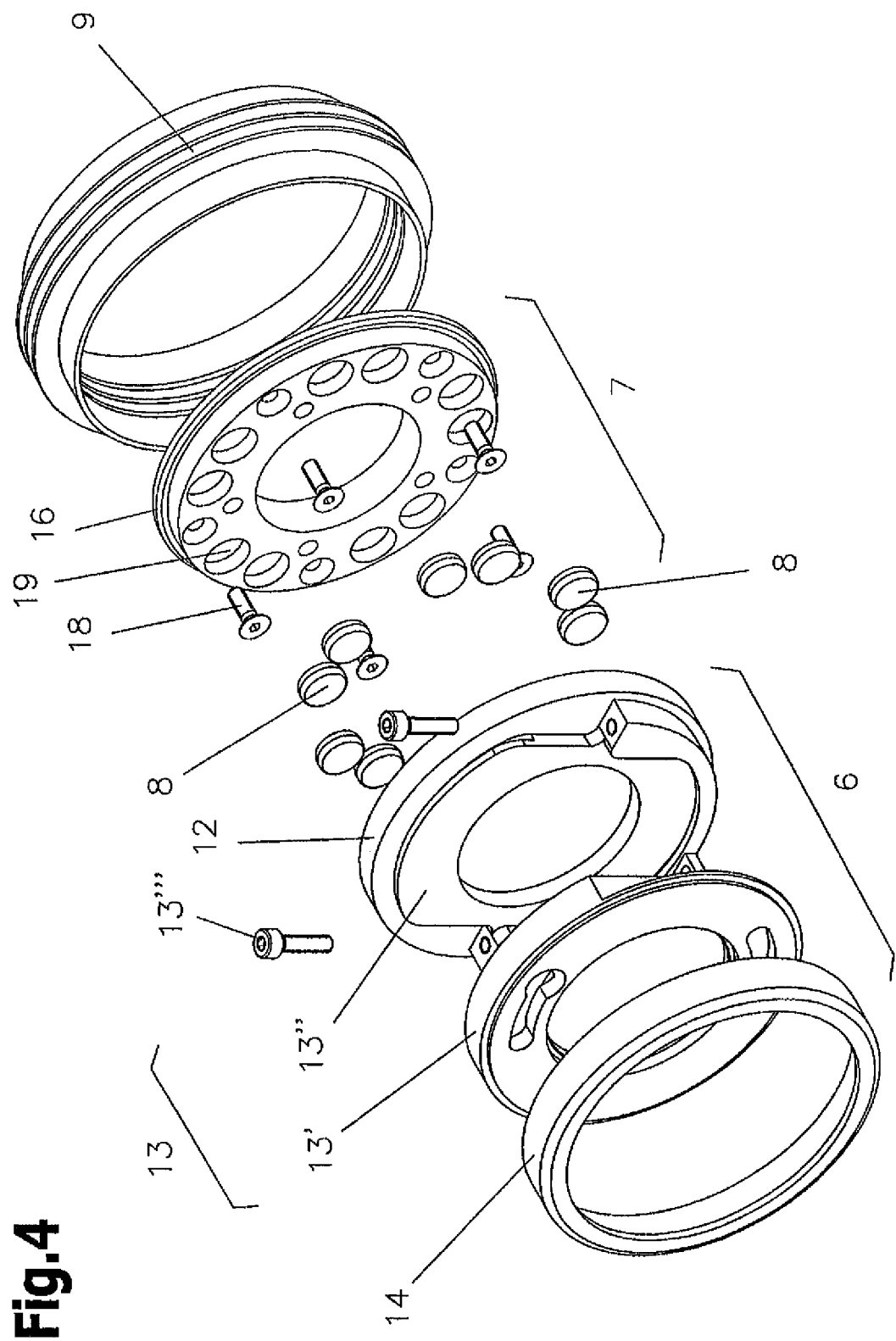
Figure 5:
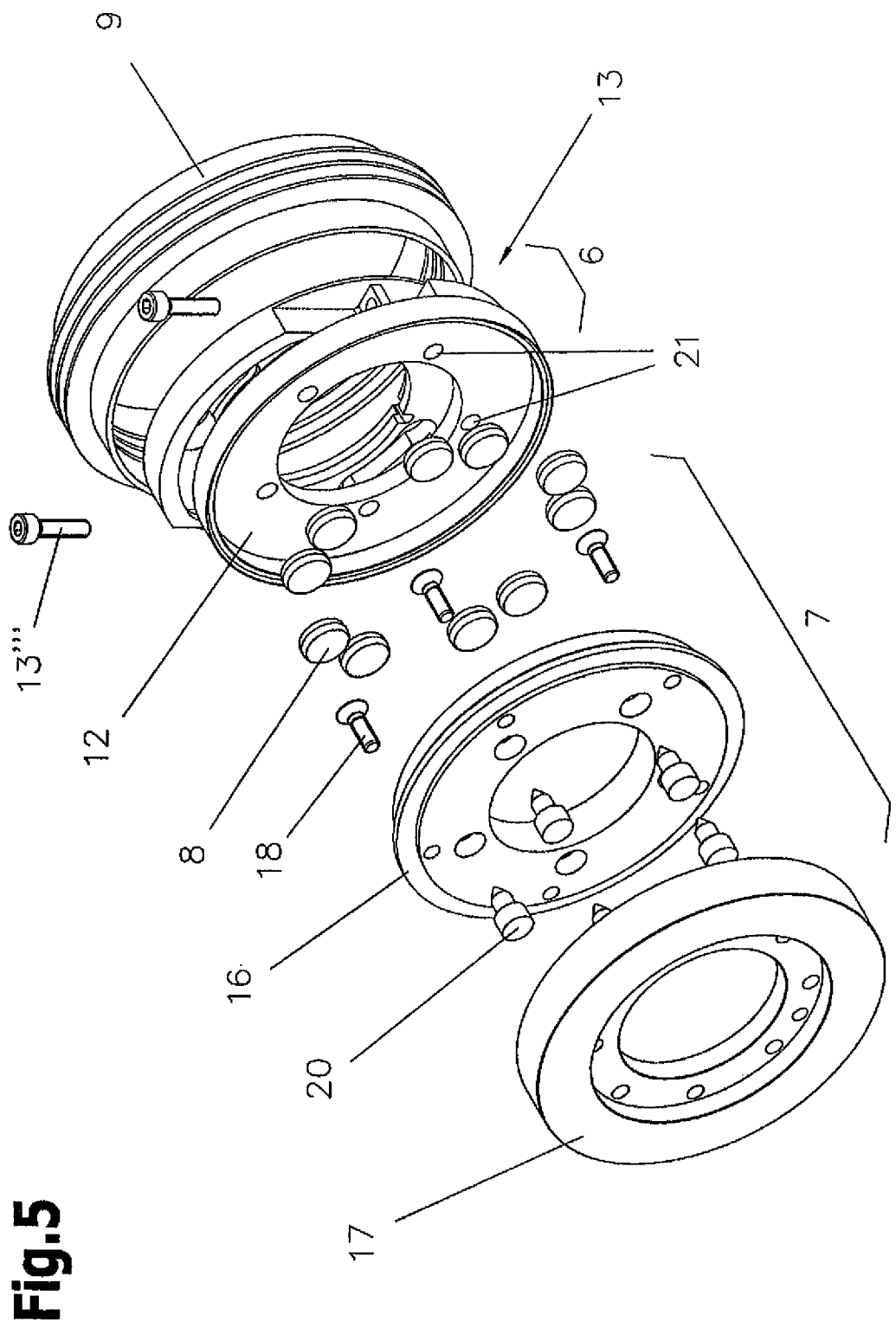
Figure 6:
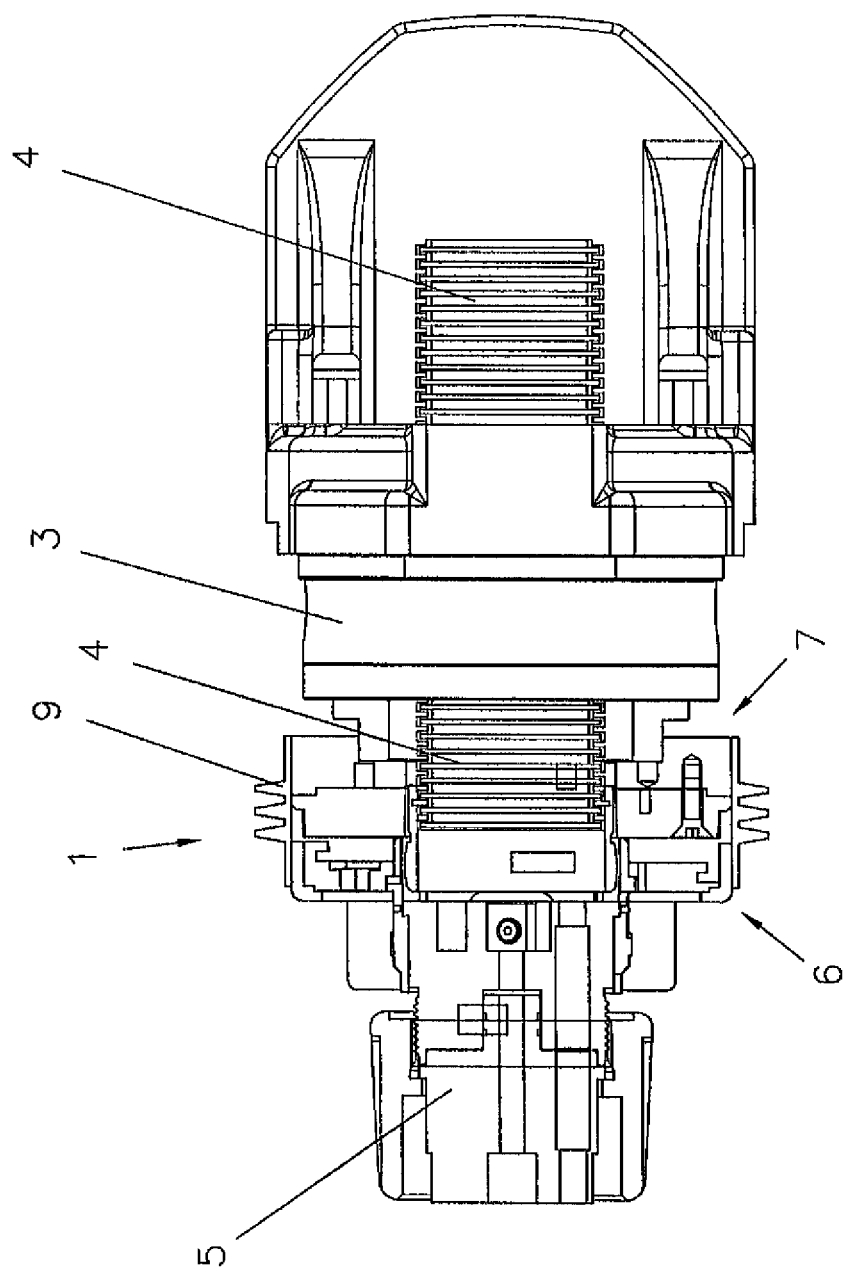
Figure 7:
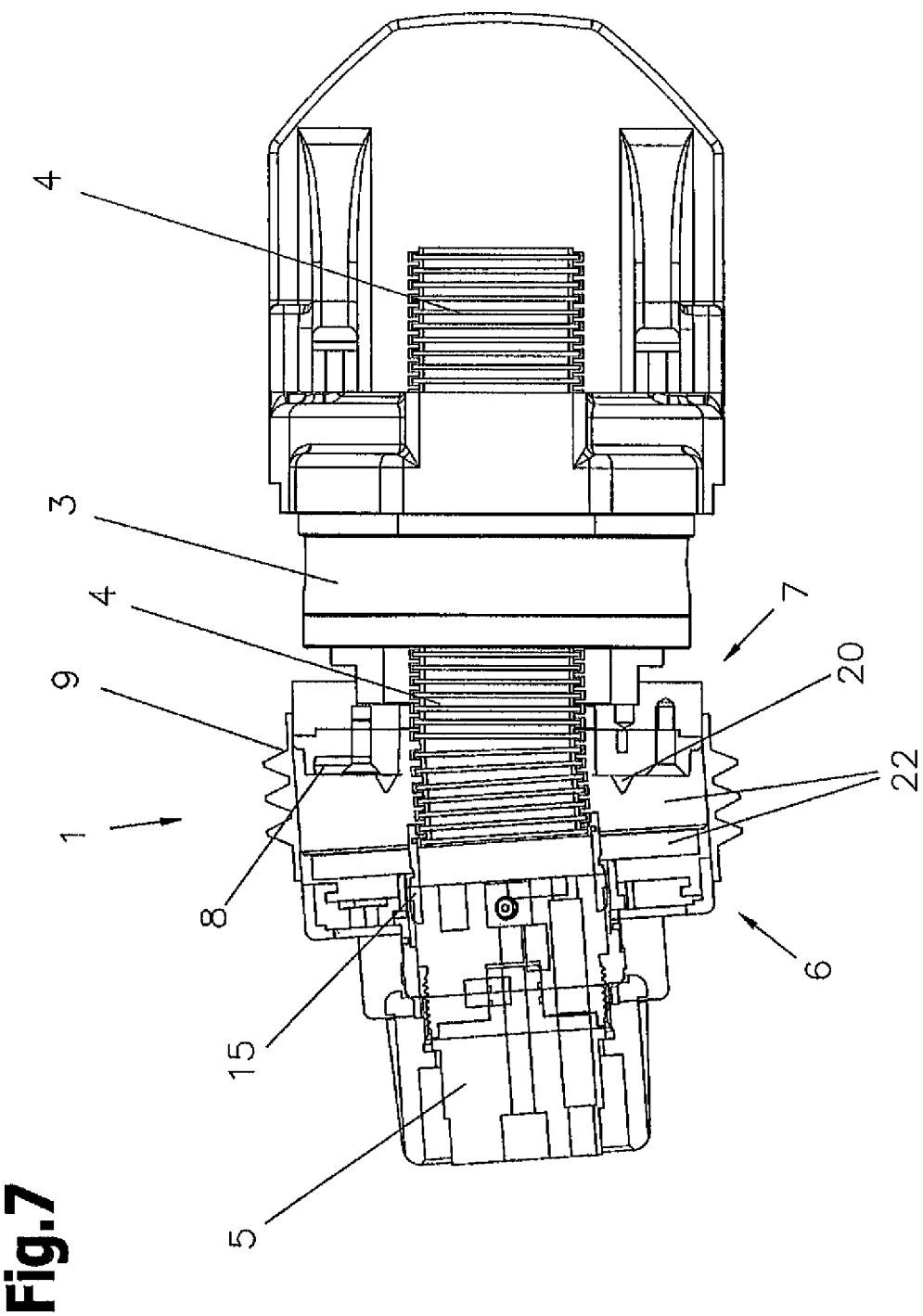

The present invention will be explained in detail by means of the enclosed drawings. There show:

FIG. 1 a perspective view of a welding torch connected to a hollow robot arm by means of a collision protection device;

FIG. 2 a plan view of an embodiment of a collision protection device in accordance with the invention;

FIG. 3 a sectional view through an embodiment of a collision protection device in accordance with the invention;

FIG. 4 and FIG. 5 exploded views of the collision protection device;

FIG. 6 a partial sectional view of a collision protection device fastened to a robot arm in normal case; and FIG. 7 the view of the collision protection device of FIG. 6 in the case of a collision of the welding torch.

FIG. 1 shows a perspective view of a collision protection device 1 in accordance with the invention, comprising two coupling elements 6, 7 that are adapted to be detachably connected to each other by magnets (not illustrated), wherein one coupling element 6 is designed to be connected to the welding torch 2 and/or to a torch coupling 5 that is adapted to be connected to the welding torch 2, and the other coupling element 7 is designed to be connected to the robot arm. The hose pack 4 is fed through the hollow robot arm 3 and through the hollow collision protection device 1 to the welding torch 2 and connected thereto.

FIG. 2 shows a plan view of a collision protection device 1, wherein bellows 9 are arranged over the two coupling elements 6, 7. These bellows 9 that consist preferably of an elastic plastic material prevent a pollution of the collision protection device 1 and substantially hold the detached welding torch 2 along with the hose pack 4. Where necessary, the bellows 9 may, due to their elasticity, autonomously return the two coupling elements 6, 7 after a collision case of the welding torch 2 at least up to a certain degree to the position in which they are connected to each other.

The cross-section illustration of an embodiment of the collision protection device 1 pursuant to FIG. 3 shows details of the collision protection device 1, such as the torch coupling 5 connected to the collision protection device 1 or the coupling element 6 thereof, respectively. The welding torch 2 is adapted to be connected to this torch coupling 5 preferably without any tool. The coupling element 6 of the collision protection device 1 which is designed to be connected to the welding torch 2 or the torch coupling 5, respectively, comprises three components, namely at least one support flange 12 that is connected to a torch attachment 13 and a protective ring 14. The further coupling element 7 of the collision protection device 1 consists of at least one base plate 16 in which the magnets 8 are arranged and which is adapted to be connected to a robot flange 17 that is designed to be connected to the robot arm 3 (not illustrated). In accordance with the invention, both coupling elements 6, 7 or the components thereof as mentioned, respectively, are provided with openings 10, 11 for feeding through the hose pack 4 (indicated with a dashed line). Additionally, an element 15 for connection to the hose pack 4 is preferably arranged at the torch coupling 5. This connecting element 15 may, for instance, engage in groovings at the outer side of the hose pack 4, as is illustrated in FIG. 2, and hence connect the hose pack 4 to the torch coupling 5. The connecting elements 15 are preferably made of plastics. Hence, the hose pack 4 is movable and/or displaceable in the coupling element 7 and fixed in the coupling element 6. Furthermore, the electrical contacts 23 are illustrated which, in the embodiment variant shown, are arranged in the torch coupling 5 and correspondingly project into the coupling element 6. The contacts 23 are arranged at the edge of the opening 10 of the support flange 12, so that they are positioned outside of the hose pack 4. Correspondingly, however, the connecting lines of the electrical contacts 23 are guided in the hose pack 4. The openings 10 and 11 preferably are of different diameters. Precisely speaking, the opening 11 of the base plate 16 is smaller. On the circular ring that results correspondingly from the difference of the diameters, the electrical contacts 23 contact the base plate 16. Thus, the base plate 16 establishes a connection between the at least two electrical contacts 23, so that the electric circuit is closed when the coupling elements 6, 7 are closed and no collision has occurred. If, in the case of a collision of the welding torch 2, the coupling elements 6, 7 are detached from each other, at least one electrical contact 23 is disconnected from the base plate 16 and the electrical circuit is interrupted, so that the welding robot may be deactivated immediately. As a matter of fact, a plurality of electrical contacts 23 may also be arranged along the circumference of the collision protection device 1.

FIG. 4 shows an exploded view of a collision protection device 1, wherein the torch attachment 13 of the coupling element 6 that is connected to the welding torch 2 or the torch coupling 5, respectively, consists of two parts 13' and 13" that are connected to each other by means of screws 13'". The fastening with the support flange 12 is, for instance, performed such that the part 13" is pushed into a groove of the support flange 12 and the part 13' is pushed into a groove of the support flange 12 from the top. By means of the screws 13'", the two parts 13' and 13" are now screwed to one another, so that they are fixed on the support flange 12. Consequently, a substantially plane support face for the magnets in the support flange 12 is the result. This two-part embodiment of the torch attachment 13 makes it easy to adapt to the torch 2. In the part 13' of the torch attachment 13, openings are integrated for fixing the torch coupling 5 or the welding torch 2, respectively, without any tools. The coupling element 7 that is designed to be connected to the robot arm 3 comprises appropriate accommodations 19 for the magnets 8 in the base plate 16. The base plate 16 and the robot flange 17 (not illustrated) are connected to each other preferably by means of screws 18.

In accordance with the exploded view of the collision protection device 1 in FIG. 5 (viewed from the side of the robot arm 3), positioning pins 20, as illustrated between the robot flange 17 and the base plate 16, are preferably arranged in the coupling element 7. They are correspondingly fastened in the base plate 16 at the side of the robot flange 17 and project from the base plate 16 at the side of the support flange 12, so that the positioning pins 20 engage in corresponding accommodations 19 in the support flange 12 of the coupling element 6 when the coupling elements 6, 7 are positioned correctly. As a matter of fact, other constructions of positioning elements may also be used to ensure that the welding torch 2 is oriented correctly relative to the robot arm 3 and the so-called "Tool Center Point (TOP)" is given.

The partial sectional plan view of an arrangement of the collision protection device 1 at a robot arm with a torch coupling according to FIG. 6 illustrates the case of an orderly welding process, wherein the two coupling elements 6, 7 of the collision protection device 1 are connected to each other.

In the collision case pursuant to FIG. 7, the two coupling elements 6, 7 of the collision protection device 1 are disconnected from each other, wherein the bellows 9 extend and the hose pack 4 is drawn by the coupling element 7. In so doing, the torch 2 fastened at the torch coupling 5 is substantially held by the hose pack 4 and partially by the bellows 9. Accordingly, an air space 22 is formed between the two coupling elements 6, 7. Likewise, by the disconnection of the coupling elements 6, 7, the electrical contacts 23 (not illustrated) are, of course, also activated or the electrical circuit is interrupted, respectively, which causes a deactivation of the welding unit. FIG. 7 also illustrates the positioning pins 20 that are moved out of the corresponding accommodations 19 due to the disconnection of the two coupling elements 6, 7. When the coupling elements 6, 7 of the collision protection device 1 are joined, which may, due to the elasticity of the bellows 9, also be performed autonomously, the positioning pins 20 provide that the welding torch 2 is oriented correctly relative to the robot arm 3. As a matter of fact, the repositioning of the welding torch 2 at the robot arm 3 may also be performed manually. The magnets 8 in the collision protection device 1 then again ensure an autonomous holding of the collision protection device 1.

The illustrations shown merely illustrate examples of embodiments of the collision protection device 1 which, as a matter of fact, may be modified correspondingly within the scope of protection defined by the claims. Likewise, the collision protection device 1 may also be used for a cutting torch, a cleaning torch, a plasma torch, or the like.

The invention claimed is:

1. A collision protection device (1) for connecting a welding torch (2) connected to a hose pack (4) to a robot arm (3) of a welding robot, comprising two coupling elements (6, 7) that are adapted to be detachably connected to each other by means of magnets (8), wherein one coupling element (6) is designed to be connected to the welding torch (2) or to a torch coupling (5) that is adapted to be connected to the welding torch (2), and the other coupling element (7) is designed to be connected to the robot arm (3), and the coupling elements (6, 7) have openings (10, 11), wherein the openings (10, 11) in the coupling elements (6, 7) are designed for feeding the hose pack (4) therethrough, and wherein the coupling element (6) that is adapted to be connected to the welding torch (2) or to the torch coupling (5), or the torch coupling (5) comprises elements (15) to be connected to the hose pack (4), while the hose pack (4) in the coupling element (7) that is adapted to be connected to the robot arm (3) is arranged to be moved.

2. The collision protection device (1) according to claim 1, wherein bellows (9) are arranged over the coupling elements (6, 7).

3. The collision protection device (1) according to claim 1, wherein the coupling element (6) that is adapted to be connected to the welding torch (2) or the torch coupling (5) is formed by at least one support flange (12) and is connected to a torch attachment (13) and a protective ring (14).

4. The collision protection device (1) according to claim 3, wherein the torch attachment (13) is adapted to be connected to the welding torch (2) or the torch coupling (5) without any tool.

5. The collision protection device (1) according to claim 3, wherein the protective ring (14) is formed of a magnetically shielding material.

6. The collision protection device (1) according to claim 1, wherein the coupling element (7) that is adapted to be connected to the robot arm (3) is formed by at least one base plate (16) and is connected to a robot flange (17), wherein the at least one base plate (16) and the robot flange (17) are connected to each other by means of screws.

7. The collision protection device (1) according to claim 6, wherein accommodations (19) for the magnets (8) are provided in the at least one base plate (16) for the detachable connection of the coupling elements (6, 7).

8. The collision protection device (1) according to claim 1, wherein the coupling elements (6, 7) are positioned via at least one positioning element.

9. The collision protection device (1) according to claim 8, wherein the at least one positioning element is formed by positioning pins (20) at one coupling element (7) and recesses (21) for receiving the positioning pins (20) at the other coupling element (6).

10. The collision protection device (1) according to claim 3, wherein electrical contacts (23) are arranged in the torch coupling (5) such that on fastening thereof the contacts (23) are positioned around the hose pack (4) in the opening (10) of the support flange (12) and connecting lines of the contacts (23) are guided in the hose pack (4).

11. The collision protection device (1) according to claim 1, wherein the openings (10, 11) in the coupling elements (6,

7) are of different diameters, so that a circular ring is formed that is designed to contact electrical contacts (23) integrated in a coupling element (6).

\* \* \* \* \*